July 7, 1959 F. C. SEEFELDT ET AL 2,893,216
METHOD OF REFRIGERATING A FINELY-DIVIDED MATERIAL
Filed Feb. 1, 1956
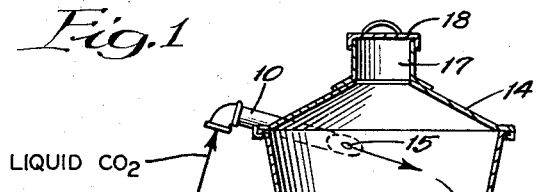
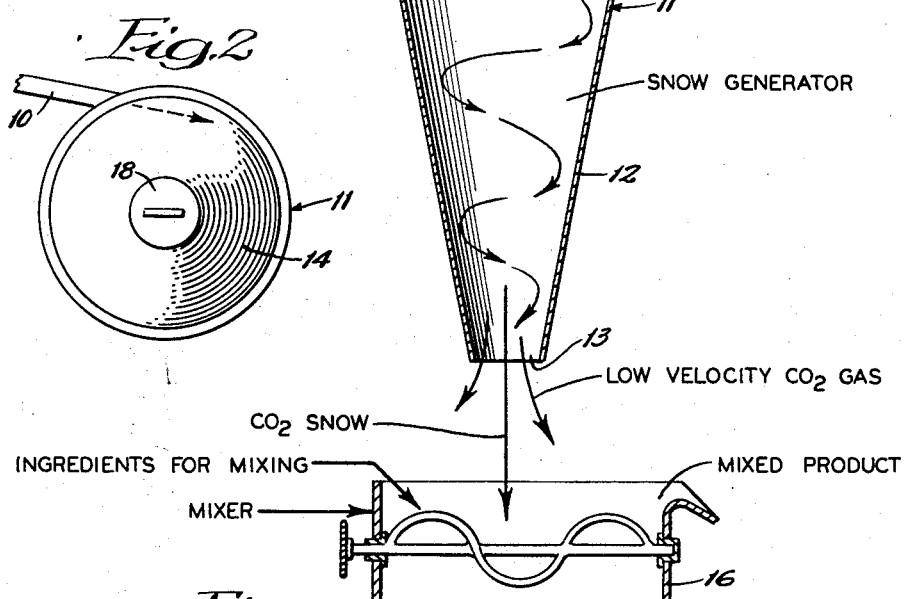
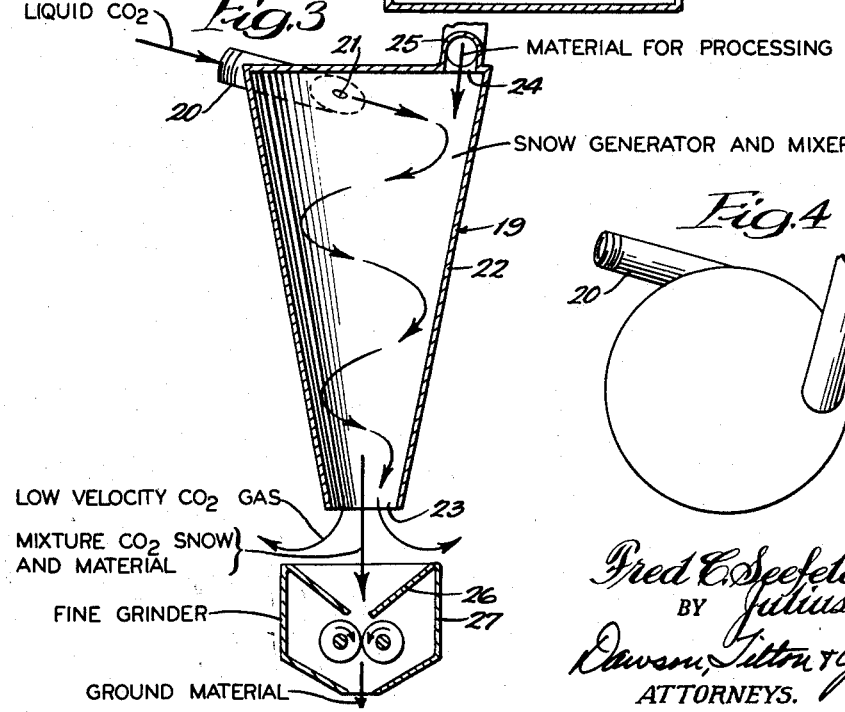
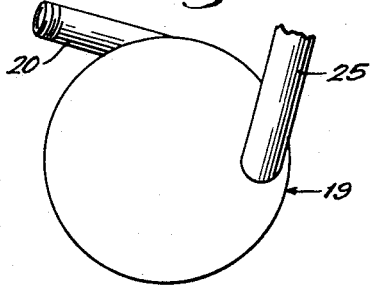

United States Patent Office 2,893,216
Patented July 7, 1959

2,893,216

METHOD OF REFRIGERATING A FINELY-DIVIDED MATERIAL

Fred C. Seefeldt, La Grange, Ill., and Julius Rubin, Revere, Mass., assignors to General Dynamics Corporation, Chicago, Ill., a corporation of Delaware Application February 1, 1956, Serial No. 562,803

2 Claims. (Cl. 62—63)

This invention relates particularly to a method of refrigerating a finely-divided material. In the method of this invention, liquid carbon dioxide is converted to a mixture of carbon dioxide snow and carbon dioxide gas, and the snow is used as the principal refrigerating medium.

Carbon dioxide snow has heretofore been known as a useful refrigerating medium for certain types of applications. Generally, it can be used as an alternative to ground carbon dioxide ice, and from a handling standpoint presents a number of advantages. Special equipment for crushing or grinding the Dry Ice is required, and there are economic disadvantages. Substantial losses occur in the crushing and grinding operations, and also during the storage of the cakes of Dry Ice due to sublimation.

Carbon dioxide snow can be readily formed by expanding liquid carbon dioxide through appropriate nozzles or orifices. Further, liquid carbon dioxide can be stored indefinitely without loss at 300 p.s.i.g. and 0° F. This is known in the trade as a low pressure system, and it includes a pressure vessel for storing the liquid carbon dioxide which is insulated and refrigerated by a small mechanical condensing unit employing a refrigerating medium such as Freon. In the expansion of one pound of liquid $CO_2$ from 300 p.s.i.g. and 0° F. down to atmospheric pressure and a corresponding temperature of −110° F., approximately 45/100 lb. of carbonic snow is theoretically obtained. The remaining part of the liquid is flashed into a gas by virtue of the refrigeration expended in the temperature reduction. Practically, liquid carbon dioxide can readily be converted to roughly 40% snow and 60% flash gas. Since the flash gas inherently has high velocity upon release, it tends to blow the snow rather violently about and also any other finely-divided material with which it comes in contact. This fact has heretofore somewhat tended to limit the application of carbon dioxide snow as a refrigerating medium.

Many industrial operations require the refrigeration of a finely-divided material where direct contact refrigeration wtih Dry Ice is the method of choice. In such applications, however, the use of carbon dioxide snow, as distinguished from ground carbon dioxide ice, has tended to be rather limited. If the liquid carbon dioxide is expanded into or adjacent the finely-divided material so that the snow can be immediately mixed therewith, the high velocity of the carbon dioxide gas produces an objectionable disturbance and blowing about of the material being refrigerated. Further, it is frequently desired to add the carbon dioxide snow to open equipment, such as mixers and grinders wherein the material is being processed.

It is therefore a general object of this invention to provide an improved method of refrigerating a finely-divided material wherein carbon dioxide snow is used as the refrigerating medium. More specifically, it is an object to provide a method of the character described which substantially overcomes the problems and limitations described above. Further objects and advantages will appear as the specification proceeds.

The present invention is shown in illustrative embodiments in the accompanying drawing, in which—

Figure 1 is a somewhat diagrammatic showing of one embodiment of the method of this invention; Fig. 2, a top view of the snow generator unit which is shown in vertical section in Fig. 1; Fig. 3, another embodiment of this invention, being a somewhat diagrammatic flow sheet; and Fig. 4, a top view of the snow generator and mixer unit which is shown in vertical section in Fig. 3.

As already indicated, this invention is concerned with a method of refrigerating a finely-divided material. In accordance with the invention, liquid carbon dioxide is expanded into an enclosed space to form a mixture of carbon dioxide gas and carbon dioxide snow. The mixture is maintained within the enclosed space until the velocity of the gas has been substantially reduced. Either at the same time or subsequently, the snow is mixed with a finely-divided material.

In the embodiment illustrated in Figs. 1 and 2 of the drawing, liquid carbon dioxide is introduced through a pipe 10 into the upper portion of a snow generator 11. In the illustration given, snow generator 11 includes a vessel 12 having downwardly converging walls with an open bottom at 13 and a closed top at 14. Casing 12 thus encloses a space which is of substantially greater cross-sectional area in the upper portion of the generator, the space progressively decreasing in cross-sectional area toward outlet 13, so that the outlet is of substantially lesser cross-sectional area than that of the enclosed space thereabove. Pipe 10 connects with an orifice 15 in the upper portion of casing 12, and is oriented, as shown more clearly in Fig. 2, to direct the snow and flash gas tangentially at a downward angle against the inner walls of generator 11. The high velocity mixture of gas and snow runs spiral downwardly, as indicated in Fig. 1, until it reaches outlet 13. By this time, the velocity of the flash gas will be greatly reduced, and it will tend to separate under the influence of gravity from the snow. The embodiment of Fig. 1 shows the snow being discharged from outlet 13 into the top of an open mixer 16, the ingredients for mixing can be introduced previously or simultaneously in the mixer 16, and after being mixed with the carbon dioxide snow, the finely-divided ingredients can be thoroughly mixed while in a refrigerated condition.

It will be noted that the top of generator 11 is provided with an opening 17, which is closed by a removable cap 18. Usually, cap 18 will be kept in place during the operation of the generator, but it can be removed if desired. When cap 18 is removed, the velocity of the gas within the generator will be further reduced, and part of the gas will escape through top outlet 17, while the snow continues to be discharged substantially entirely through bottom opening 13. However, it has been found that very satisfactory results can be obtained by discharging all the gas and snow through bottom opening 13. In this case, top opening 17 will be mainly used for servicing or cleaning the inside of the generator. One advantage of discharging the gas at a low velocity through bottom opening 13 together with the snow is that it can be brought into contact with the ingredients for mixing, thereby producing an additional cooling effect.

Referring now to the embodiment shown in Figs. 3 and 4 of the drawing, it will be seen that the snow generator unit 19 is somewhat similar in construction to snow generator 11. It has an inlet pipe 20 for the liquid carbon dioxide communicating with an orifice 21 in the upper side wall of casing 22. Casing 22 has a frusto-conical configuration, tapering downwardly to a discharge outlet 23. Orifice 21 differs slightly from orifice 15 in being elliptical instead of circular, and this construction is preferred. As in the previously described generator, however, the carbon dioxide gas and snow which is formed by the expansion of the liquid carbon dioxide through orifice 21 is discharged tangentially downwardly against the upper portion of the inner walls of generator 19. In generator 19 another inlet is provided at 24 which communicates with a conduit 25, the conduit being oriented more clearly as shown in Fig. 4. The finely-divided material for processing is introduced through conduit 25 and discharged from inlet opening 24 into the direct path of the downwardly spiralling snow and gas. It is caught up in the swirl and effectively mixed with the snow. Thus, unit 19 functions both as a snow generator and mixer. The material after mixing with the snow is discharged downwardly into the hopper 26 of a grinder 27, while the low velocity carbon dioxide gas fans out from outlet 23 and separates from the solids. Because of the low velocity of the gas, it does not interfere with the downward movement of the finely-divided solids under the influence of gravity. In this way, a refrigerated mixture can be ground or pulverized. If desired, the snow and solids mixture can be held in hopper 26 for a short time to bring the material to the low temperature desired for the grinding operation. Alternatively, the mixture of snow and finely-divided solids can be discharged onto a conveyor belt, and then passed to the grinder, the cooling continuing while the mixture is carried along the conveyor belt.

The embodiments of Figs. 3 and 4 are particularly useful for processing material preparatory to a further subdivision of the material and where the material must be cooled to a low temperature to facilitate the comminuting or pulverizing. It can be used for other purposes, such as in connection with the type of operation described for the embodiment of Figs. 1 and 2. Some or all of the ingredients for mixing could be passed into the upper portion of the generator, mixed therein with the snow, and discharged into a mixer, or other processing unit.

For best results, it is desirable that the generator units have very smooth interior walls. For example, the generator casings might be formed of polished stainless steel. Alternatively, a lining of smooth material, such as Plexiglas, can be used. The generators can be insulated, but this is not particularly desirable. Usually, the generators will be employed intermittently, and by avoiding the use of insulation, the generators will clear themselves of snow between the operations. Even with very smooth interior walls, small amounts of snow will tend to build up on the walls during sustained operation. This is another reason for having the gas discharged through the bottom of the generators, since in this way the gas tends to keep the snow from accumulating on the walls of the generators.

As a specific example of the method of this invention, liquid carbon dioxide at 300 p.s.i.g. and 0° F. is supplied through a generator like that shown in Figs. 1 and 2 of the drawing. The generator has a height of around 2 feet and tapers from a diameter of about 1 foot at the top to a diameter of 4 inches at the bottom outlet. The inlet orifice has a diameter of .06 inch. The liquid carbon dioxide is expanded through the orifice at the rate of 5 lbs. per minute, producing approximately 40% snow and 60% gas. The mixture of snow and gas is discharged through the bottom outlet, and the snow is dropped into an open mixer unit. The mixer is a commercial blender unit which is used for the manufacture of a pie crust mixture. In the blender, the shortening (lard) is mixed with the flour and other ingredients until a homogeneous mixture is obtained. By chilling the shortening to approximately 34° F., it becomes sufficiently rigid to mix well with the other finely-divided ingredients. This temperature is easily obtained by the snow that is discharged into the mixer, and the mixing operation can be carried out while the snow is being discharged. The low velocity of the gas, even though the gas comes in contact with the materials being mixed, does not unduly disturb the materials or blow them about. If desired, the supply line for the liquid carbon dioxide to the generator can be equipped with an automatic control valve, which is adapted to be operated by an on-off thermostatic control within the blender unit. In this way, the quantity of snow supplied to the blender can be effectively regulated.

In another specific example, sea moss in a subdivided condition is discharged into the top of a generator unit such as that shown in Figs. 3 and 4 of the drawing. At the same time, liquid carbon dioxide is expanded into the upper portion of the generator. As the sea moss falls downwardly under the influence of gravity it is mixed with the snow and driven about in a spiral path by the velocity of the gas. The mixture of sea moss and snow can then be discharged directly into a fine grinder, or into a hopper or grinder conveyor. The pulverizing of the raw moss is facilitated by thoroughly mixing it with the carbon dioxide snow. Good results can be obtained by controlling the proportions of snow relative to the moss so that about 1 lb. of snow is present for each pound of moss. With the usual conversion efficiencies, this would require about 2 lbs. of liquid carbon dioxide to be supplied to the generator for each pound of moss. Somewhat lesser or greater ratios of liquid carbon dioxide can be used, depending upon the required temperature in the grinding operation. Sea moss is also known as Irish moss, and is the dried form of red sea plants such as *Chrondus crispus*. It is processed commercially to produce protective colloids or stabilizers which are used in such products as chocolate milk, ice cream, toothpaste, etc. A similar process can be used for treating any material which it is desired to refrigerate before or during grinding. Many materials, such as agar agar, can be ground much more readily when refrigerated to an embrittled condition. Phosphorus pentasulfide is a material which softens from heat generated in grinding and is also subject to spontaneous combustion without an inert atmosphere. It can therefore be advantageously processed by the method of this invention.

In the foregoing specification this invention has been described in relation to specific embodiments thereof and many details have been set forth for purpose of illustration. It will be apparent to those skilled in the art, however, that the invention is susceptible to other embodiments and that many of the details can be varied considerably without departing from the basic concepts of the invention.

We claim:

1. The method of refrigerating a subdivided material preparatory to further size reduction thereof, comprising expanding liquid carbon dioxide into the upper portion of a vessel having downwardly converging walls and an open bottom, the cross-sectional area of said vessel progressively decreasing from the upper to the lower portion thereof, forming a mixture of carbon dioxide gas and carbon dioxide snow in the upper portion of said vessel, introducing a subdivided material requiring refrigeration to prepare it for further size reduction into the upper portion of said vessel in the path of said mixture of gas and snow, maintaining said mixture within said vessel until the velocity of said gas has been substantially reduced while at the same time refrigerating said material by contacting it with said snow, and then discharging the refrigerated material through the open bottom of said vessel together with the gas of reduced velocity.

2. The method of refrigerating a finely-divided material, comprising expanding liquid carbon dioxide into the upper portion of a vessel having downwardly converging walls and an open bottom, the cross-sectional area of said vessel progressively decreasing from the upper to the lower portion thereof, forming a mixture of carbon dioxide gas and carbon dioxide snow in the upper portion of said vessel, maintaining said mixture within said vessel until the velocity of said gas has been substantially reduced, whereby said snow can be discharged at a reduced velocity through said open bottom, and bringing the said snow into contact with a finely-divided material to refrigerate said material.

References Cited in the file of this patent

UNITED STATES PATENTS

| | | |
|---|---|---|
| 1,739,761 | Kleinfeldt | Dec. 17, 1929 |
| 1,924,059 | La Grange | Aug. 22, 1933 |
| 1,927,175 | Josephson | Sept. 19, 1933 |
| 1,933,257 | Goosmann | Oct. 31, 1933 |
| 2,261,808 | Morris | Nov. 4, 1941 |
| 2,392,297 | Strenitz | Jan. 1, 1946 |